United States Patent [19]
Laplume

[11] 3,872,608
[45] Mar. 25, 1975

[54] TEACHING MACHINE

[75] Inventor: Jacques Laplume, Le Plessis-Robinson, France

[73] Assignee: Societe D'Etudes Techniques et D'Enterprises Generales (SODETEG), Le Pressis-Robinson, France

[22] Filed: June 27, 1973

[21] Appl. No.: 374,106

[30] Foreign Application Priority Data
June 30, 1972   France .............................. 72.23765

[52] U.S. Cl. ................................................ 35/9 A
[51] Int. Cl. ........................................... G09b 7/02
[58] Field of Search ..................... 35/9 C, 9 A, 48 A

[56] References Cited
UNITED STATES PATENTS

| | | | |
|---|---|---|---|
| 2,228,331 | 1/1941 | Warner .............................. | 35/48 A |
| 3,100,352 | 8/1963 | Boissevain ............................ | 35/9 C |
| 3,141,244 | 7/1964 | Smith ................................... | 35/9 C |
| 3,187,443 | 6/1965 | Schure et al. ........................ | 35/9 C |

Primary Examiner—Wm. H. Grieb
Attorney, Agent, or Firm—Karl F. Ross; Herbert Dubno

[57] ABSTRACT

A teaching machine operable by a student comprises a tape recorder whose tape stores a series of instructions which terminate in questions each calling for one of several alternative responses, these instructions being successively communicated to the student through a pair of headphones. After each question the recorder stops automatically, by emitting a signal to set a flip-flop in its drive circuit, while one of several conductor bars on the bottom of a card holder is energized through a selector switch to light a corresponding lamp. A card on the holder is orthogonally divided into areas forming rows aligned with respective conductor bars, this card being pierceable by a conductive stylus at an area representing the student's chosen answer. The stylus, on contacting the underlying bar, energizes a stepping motor for the selector switch and simultaneously resets the flip-flop to restart the recorder drive preparatorily to energization of the next bar at the end of the following instructions.

7 Claims, 4 Drawing Figures

TEACHING MACHINE

BACKGROUND OF THE INVENTION

The present invention relates to teaching machines, and more particularly to such machines of the audiovisual, individual type which are equipped to facilitate the monitoring of the acquisition of knowledge by the students or student using them.

Various models of such machines have already been proposed. These models are generally characterised by the fact that the correct answer to the questions put to the student is recorded in coded form upon a carrier of audible or visible data, so that the machine itself can decide whether the answer provided by the student is correct or not. While these machines may tabulate correct and/or incorrect answers, they generally do not reveal what answer the student has given to a particular question.

OBJECT OF THE INVENTION

The object of my present invention is to provide a taching machine which is simplified, in terms of both structure and programming, with reference to conventional devices of this character and which does not require any coding.

SUMMARY OF THE INVENTION

This object is realized, in accordance with my invention, by the provision of a teaching machine in which a programmer provided with a movable recording medium, such as a magnetic tape, stores a series of instructions each calling for one of several alternative responses by a student using the machine, these instructions being successively communicated to the student through a transducer such as a pair of headphones. The recording medium is intermittently advanced by a drive motor whose energizing circuit includes an electronic switch, such as a flip-flop, which causes the motor to stop in response to a signal from the recording medium upon completed transmission of any instruction to the transducer. A perforable card displaying a multiplicity of areas divided into a plurality of rows, advantageously in an orthogonal array, is positionable on a holder above a set of conductor bars which underlie respective rows of the array, each area within a row being correlated with a respective response to the corresponding instruction; thus, the student can indicate his choice of response to a given instruction — i.e., an answer to a question posed at the end of that instruction — by piercing one of the areas of the corresponding row with a conductive marker (referred to hereinafter as a stylus) contacting the underlying bar. A selector energizes any one of these conductor bars, in respective operating positions thereof, under the control of the electronic switch whenever the drive motor of the recorder is stopped at the end of an instruction readout; this energization also causes the lighting of an individual indicator lamp identifying the respective bar and therefore the set of possible answers to the question just posed. When the student pierces the card with the stylus, an operating circuit is closed for a stepping motor which advances the selector to the next position thereof, thus de-energizing the bar just contacted, while the electronic switch is reversed to restart the recorder drive.

BRIEF DESCRIPTION OF THE DRAWING

Other features and advantages of my invention will become more apparent from the following detailed description given with reference to the accompanying drawing in which.

SPECIFIC DESCRIPTION

Figure 1:
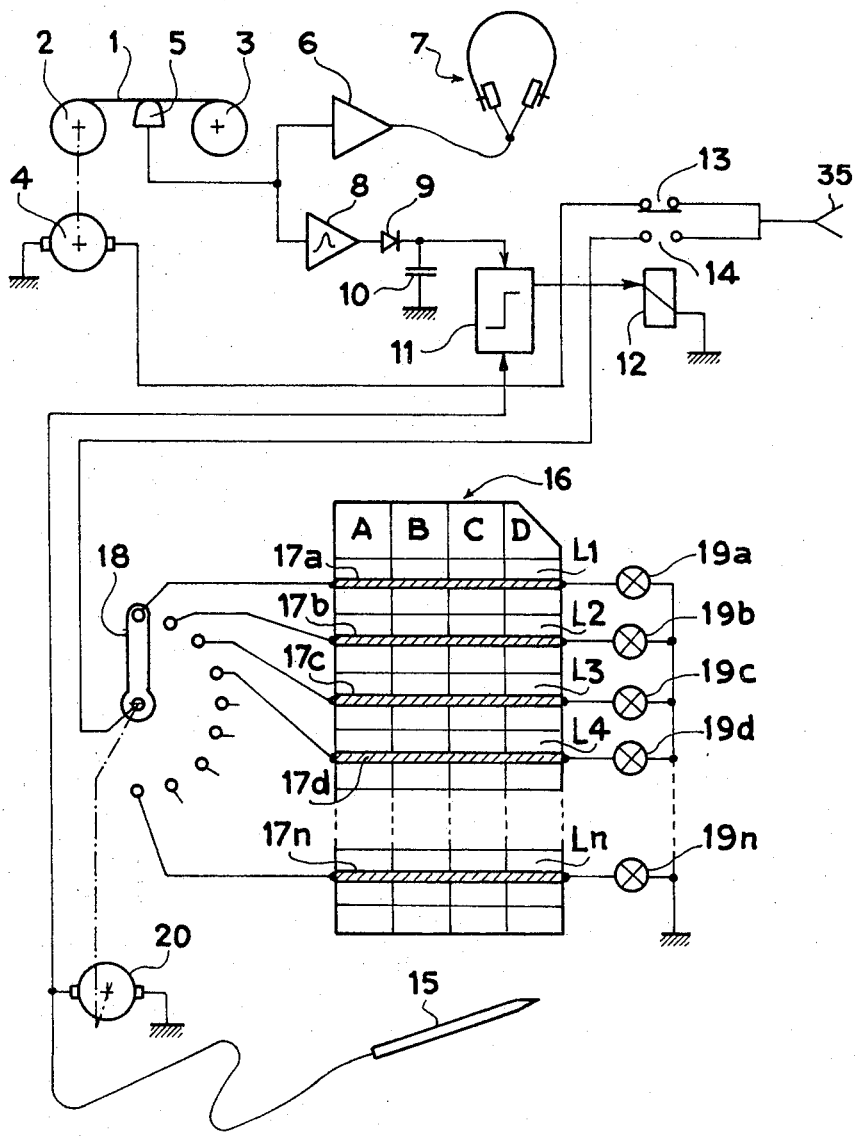
FIG. 1 is an electrical diagram of the machine.

In FIG. 1, a schematic illustration has been given of a tape recorder comprising a magnetic tape 1 wound onto two spools 2 and 3 driven by a motor 4. The recorded signals read by a head 5 are amplified in an amplifier 6 connected to a pair of headphones 7. The tape carries, as part of a course to be taught, a series of instruction items in accordance with the linear-programming principle; each item terminates in a question which is put to the student, this question automatically halting the recorder which is restarted only after an answer to the question has been given, under conditions which will be described hereinafter, by the student.

The automatic stopping of the recorder at the end of each item is achieved by means known per se, e.g., by recording a stop signal in the form of a frequency located outside the useful voice frequency band, for example around 70Hz, this frequency preferably being eliminated during the recording of the audible message to prevent any risk of inadvertent stopping of the recorder. The stop frequency is detected by a selective amplifier 8 whose output signal, after rectification and filtering in a circuit symbolized by a diode 9 and a capacitor 10, sets a bistable trigger stage or flip-flop 11 to energize a relay 12. The relay armature, by open-circuiting a pair of contacts 13, cuts off the power supply from a source 35 to the motor 4 and stops the recorder.

Alternatively, the stop signal may be recorded upon an auxiliary track of the tape 1 and read by a special head.

A marker enabling the student to answer the question put to him, is a metal stylus 15 associated with a card 16. The card 16 is divided into rectangular boxes distributed in columns A, B, C, D . . . and rows L1, L2, . . . Ln. Each row L1 etc., corresponds to an instruction item, and, consequently, to a specific question. Each column A, B, C, D . . . corresponds to a possible answer to the question posed. These answers are indicated to the student in an accompanying booklet or by means of a slide projector in which change from one slide to the next is synchronized with the recorder. Only one of the answers is correct. The student chooses his answer to the question posed by using the stylus 15 to penetrate the box corresponding to his selection in column A, B, C or D in the row corresponding to the particular item. The card 16 may be conventionally weakened at a location designed for perforation, in each box so that a light pressure on the stylus produces a clean hole in the card. When the card has been perforated in this fashion, the stylus comes into contact with a conductive bar 17a, 17b, 17c, 17d, . . . 17n connected to a respective indicator lamp 19a, 19b, 19c, 19d, . . . 19n. These bars are energized from voltage source 35 across a pair of contacts 14, bridged by the armature of the relay 12 upon the setting of the flip-flop 11, in series with a rotary selector switch 18.

On start, the switch 18 is positioned to energize the first bar 17a in the manner indicated in FIG. 1. When the recorder stops at the end of the first instruction item, the contacts 14 are closed and the bar 17a has a voltage applied to it. The pilot lamp 19a lights up, indicating to the student in what row of the card 16 the perforation should be made. If the student, for example, considers that the correct answer to the question put to him is the one identified by reference B, then he perforates the card in that box of column B which is aligned with the lighted lamp, i.e., the row overlying the bar 17a. When the stylus 15 is in contact with the bar 17a, the voltage on the bar is transmitted by that stylus, on the one hand, to a stepping motor 20 for selector switch 18 and, on the other hand, to the resetting input of flip-flop 11. The switch 18, operated by the motor 20, advances one step and applies voltage to the bar 17b. At the same time the relay 12 is de-energized, cutting the supply to the switch 18 and, across the contacts 13 which have been closed again, restarts the recorder. The lamp 19c is now extinguished.

The second instruction item starts with an indication of the correct answer to the question posed previously, with supporting explanations. The student then finds out immediately whether or not his answer, correlated in the present example with column B, was correct or not. If he has made an error, he cannot go on to correct his answer since the card has already been perforated in column B and in any case the corresponding bar 17a no longer carries a voltage.

Upon completion of the second item of instruction, the same operations are carried out as before. This time, it is the bar 17b which is live and the lamp 19b which lights up as soon as the record player stops.

It will be seen that it is very easy for the student to give his answer, since he merely has to perforate the card in the selected column in line with the lamp which has lit up. The lighting of the lamp also indicates to the student the number of the item with which he is going to be faced ; thus, he can very easily and correctly consult the accompanying booklet in order to find the alternative answers which have been proposed in relation to this item.

Because of the fact that the bars 17a etc., are de-energized as soon as the corresponding questions have been answered, it is impossible for the student to restart the recorder by inserting the stylus into an existing perforation. He is thus also prevented from cheating by perforating the card in the proper box after having determined what the correct answer is.

Figure 2:
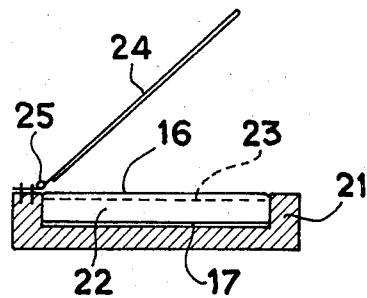
FIG. 2 is a cross-sectional view of a card holder associated with the machine, into which the student introduces a preferable card at the commencement of the lesson.

To ensure correct positioning of the card above the bars, it is advantageous to utilize a device such as that schematically illustrated in FIG. 2 where the bars 17a – 17n have been collectively designated 17. A card holder 21 comprises a tray 22 which conforms to the contours of the card. The latter rests upon a grid 23 through which the perforating stylus can make contact with the bar 17 arranged at the bottom of the tray. A cover 24, pivoting about a hinge 25, swings down onto the card and holds it in position. The cover 24, preferably made of transparent plastic, is provided opposite each box of the card with an aperture through which the student can introduce the stylus. The cover can be locked by means of a key whose operation also sets the switch 18 to its starting position.

Figure 3:
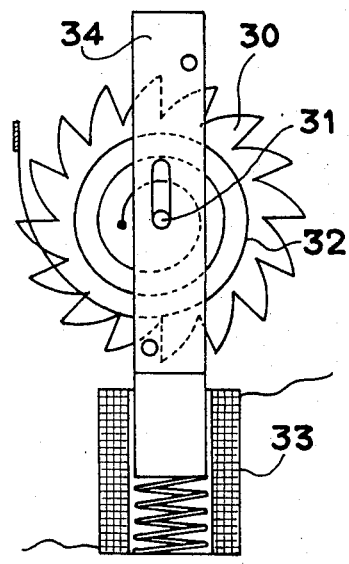
FIG. 3 is a detail view of a modified selector mechanism for the machine of FIG. 1.

The stepping motor 20 can comprise an escapement mechanism of the ratchet-wheel type. Thus, as illustrated in FIG. 3, a ratchet wheel 30 is fixed to the shaft 31 of the switch 18 and is biased by a spring 32. Manual resetting of the switch 18 to a starting position, shown in FIG. 1, winds up the spring 32. Stepping is produced by the action of an electromagnet 33 which reciprocates a detent 34 and enables the ratchet wheel 30 to rotate one notch. The advantage of this embodiment is that the energy required to release the escapement is much smaller than that which is required to rotate the switch one step so that the device can operate completely independently, using a simple dry cell.

It is also possible to replace the electromechanical switch 18 by an electronic switch which performs the same functions.

Figure 4:
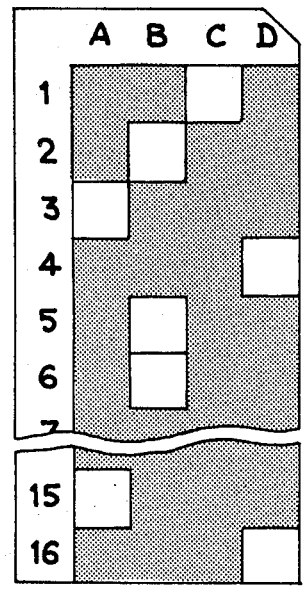
FIG. 4 is a face view of a reference card which can be utilized for rapid visual monitoring of the student's work.

When the lesson has been terminated, the student withdraws the card 16 from the card holder. As indicated before, the distribution of the perforations indicates the succession of answers given to the different questions. A card reader associated with suitably programmed data-processing equipment makes it possible to calculate the mark achieved by the student or to exploit the data thus recorded for other purposes. More simply, the assessment of the student's work can be made visually in the following manner. The instructor has a reference card, similar to that shown in FIG. 4. This card, of dark color, contains perforations or clear areas at the locations corresponding to the correct answers. Upon placing the card returned by the student over the reference card and transluminating the two cards, the instructor will see a dark spot in the position of each incorrect answer.

This check can be carried out by the student himself. To this end, he is provided with a collection of reference cards, all different and marked by corresponding identification numbers. At the end of the lesson, the tape recorder verbally states to the student the number of the reference card which corresponds to the course. The student checks the results of his work as described above by means of the reference card indicated to him. Since the student is not aware, until the end of the course, of the identification number of the corresponding reference card, he cannot use this to cheat and select the correct answers to each question in advance.

Obviously, the recorder could be replaced by any other programmer capable of reconstituting a previously recorded audible message, associated with an automatic stop and restart device.

Finally, such an audible-message reproducer can be supplemented by a slide projector synchronized therewith.

I claim:

1. A teaching machine comprising:
   programming means provided with a movable recording medium storing a series of instructions each calling for one of several alternative responses by a student, transducer means for successively communicating said instructions to the student, drive means for intermittently advancing said recording medium from one instruction to the next, an energizing circuit for said drive means, and electronic switch means in said energizing circuit responsive to signals from said recording medium for stopping said drive means upon completed transmission of any instruction to said transducer means;

a holder for a perforable card displaying a multiplicity of areas divided into a plurality of rows each corresponding to one of said instructions, each area within a row being correlated with a respective response to the corresponding instruction;

a plurality of conductors on said holder positioned to underlie said card in alignment with respective rows thereof;

selector means provided with a plurality of operating positions for respectively energizing said conductors by way of said switch means upon a stopping of said drive means;

a plurality of indicators connected to said conductors for energization in the respective operating positions of said selector means;

a conductive marker operable by the student to perforate said card at any area of a row identified by an energized indicator to make contact with the underlying conductor, thereby registering the student's response on the card; and stepping means for said selector means connected to said marker for actuation by an energized conductor contacted thereby, said marker being connected to said switch means for reversing same concurrently with actuation of said stepping means to restart said drive means.

2. A teaching machine as defined in claim 1 wherein said switch means comprises a bistable trigger stage.

3. A teaching machine as defined in claim 1 wherein said indicators are lamps.

4. A teaching machine as defined in claim 1 wherein said selector means comprises a spring-loaded shaft, a ratchet on said shaft movable against the spring force into a starting position, and escapement means electromagnetically controlled by said stepping means for allowing said spring force to impart intermittent rotation to said ratchet and said shaft.

5. A teaching machine as defined in claim 1 wherein said holder comprises a tray and a card-supporting grid in said try above the bottom thereof, said conductors being a set of bars extending along said bottom.

6. A teaching machine as defined in claim 5 wherein said tray is provided with a transparent cover hinged thereto and positionable to overlie said grid.

7. In combination, a teaching machine as defined in claim 6 and a card receivable in said tray between said grid and said cover, said card having said areas distributed thereon in an orthogonal array.

* * * * *